United States Patent
Muthiah et al.

(10) Patent No.: US 12,417,043 B2
(45) Date of Patent: Sep. 16, 2025

(54) SELECTABLE PERFORMANCE BOOST FOR STORAGE DEVICES

(71) Applicant: Sandisk Technologies, Inc., Milpitas, CA (US)

(72) Inventors: Ramanathan Muthiah, Bangalore (IN); Taninder Singh Sijher, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/448,887

(22) Filed: Aug. 11, 2023

(65) Prior Publication Data

US 2024/0419348 A1     Dec. 19, 2024

Related U.S. Application Data

(60) Provisional application No. 63/521,851, filed on Jun. 19, 2023.

(51) Int. Cl.
  G06F 3/06     (2006.01)

(52) U.S. Cl.
  CPC ............ *G06F 3/064* (2013.01); *G06F 3/0607* (2013.01); *G06F 3/0679* (2013.01)

(58) Field of Classification Search
  CPC ...... G06F 3/0634; G06F 3/064; G06F 3/0607; G06F 3/0679; G06F 3/068; G06F 3/061; G06F 3/0614; G06F 3/0608; G06F 3/0629; G06F 3/0632; G06F 3/0638; G06F 3/0616; G06F 3/0611
  USPC ........ 711/101–104, 107, 161, 164, 165, 170, 711/171
  See application file for complete search history.

(56) References Cited

U.S. PATENT DOCUMENTS

| | | | |
|---|---|---|---|
| 6,807,106 B2 * | 10/2004 | Gonzales | G11C 11/56 365/230.03 |
| 7,111,121 B2 * | 9/2006 | Oishi | G06F 21/6218 711/115 |
| 8,478,963 B2 | 7/2013 | Chang | |
| 8,479,080 B1 * | 7/2013 | Shalvi | G06F 12/0246 714/766 |
| 9,201,786 B2 | 12/2015 | Miyamoto et al. | |
| 9,690,491 B2 * | 6/2017 | Sinclair | G06F 3/061 |
| 2008/0005583 A1 | 1/2008 | Shen | |

(Continued)

FOREIGN PATENT DOCUMENTS

EP     4109230 A1     12/2022

*Primary Examiner* — Reginald G Bragdon
*Assistant Examiner* — Zakaria Mohammed Belkhayat
(74) *Attorney, Agent, or Firm* — Patterson + Sheridan, LLP

(57) ABSTRACT

A data storage device is configured to boost either capacity or performance using a set of reserve memory blocks. The data storage device includes a storage media and control circuitry. The storage media includes first set of memory blocks at a first capacity level and a first performance level and a reserve set of memory blocks. The control circuitry is configured to, in response to receiving a selection of a first storage mode from a user, allocate the reserve set of memory blocks to provide a second performance level greater than the first performance level. The control circuitry is further configured to, in response to receiving a selection of a second storage mode from the user, allocate the reserve set of memory blocks to provide a second capacity level greater than the first capacity level.

19 Claims, 5 Drawing Sheets

(56) References Cited

U.S. PATENT DOCUMENTS

| | | | |
|---|---|---|---|
| 2011/0246790 A1* | 10/2011 | Koh | G06F 21/78 |
| | | | 713/193 |
| 2014/0025868 A1* | 1/2014 | Furuhjelm | G06F 12/0866 |
| | | | 711/103 |
| 2017/0092081 A1 | 3/2017 | Tsai | |
| 2017/0153955 A1* | 6/2017 | Lee | G06F 3/0614 |
| 2018/0107332 A1* | 4/2018 | Chan | G06V 40/12 |
| 2018/0129440 A1 | 5/2018 | Bandic et al. | |
| 2021/0064249 A1 | 3/2021 | Mehta et al. | |
| 2022/0197505 A1* | 6/2022 | Kannan | G06F 11/3433 |
| 2024/0160376 A1* | 5/2024 | Ghaly | G06F 3/0608 |

\* cited by examiner

SELECTABLE PERFORMANCE BOOST FOR STORAGE DEVICES

CROSS-REFERENCE TO RELATED APPLICATIONS

The present application claims priority to U.S. Provisional Patent Application Ser. No. 63/521,851, filed Jun. 19, 2023, entitled SELECTABLE PERFORMANCE BOOST FOR STORAGE DEVICES, the disclosure of which is hereby incorporated by reference in its entirety.

BACKGROUND

Field

This disclosure relates to improving the performance of storage devices. More particularly, the disclosure relates to devices and methods for boosting selected aspects of performance of a storage device.

Description of Related Art

Solid state drive (SSD) performance is typically measured using several key metrics that evaluate its speed and efficiency. The most common performance measurements for SSDs include read/write speed and endurance.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1A:
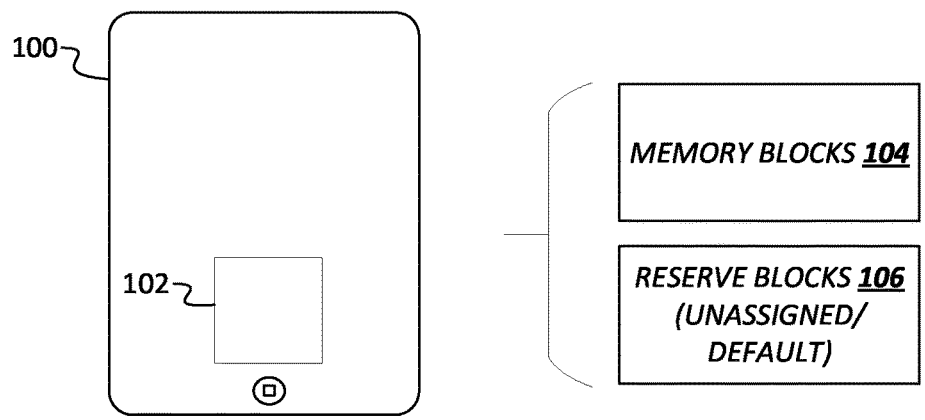
FIGS. 1A-1C are diagrams illustrating various configurations of a data storage device that have reserve blocks that can be used to boost different performance levels, according to certain embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Storage devices typically store various types of data, which may be accessed with different types of frequency. For example, some data may be cold data, such as archival data, that are accessed rarely. Some data can be hot data, such as caches, programs or games, that are accessed often. Due to the different use cases, different types of data can benefit from being stored on storage devices with different performance and cost profiles. For example, hot data may be placed in faster storage, while cold data may be placed in slower, cheaper storage.

In a home setting, a home computer may have just one or at most a few storage devices, so have a limited ability to select different storage devices based on performance. Thus, a home user can benefit from having a single storage device that can be changed to boost particular aspects of the storage device based on its current usage. For example, if the storage device is mainly being used to store application or operating system data, read/write performance and/or endurance can be boosted. If the storage device is mainly being used to store media files, such as videos, pictures, or music, that are usually only read occasionally, capacity can be boosted.

The following devices and methods for selectively boosting a data storage device's performance include a user interface that enables the user to select a desired performance mode for the data storage device, and/or specify the size or performance boost in each performance mode. SSDs can be over-provisioned in relation to their stated capacity. Over-provisioning is the practice of allocating more physical space on the SSD than the logical size of the drive. This extra space is used by the SSD controller for wear-leveling, garbage collection, and other maintenance tasks. For example, an SSD may be overprovisioned from 10-25%, though 15-20% is typical. These overprovisioned blocks may be used as a source of reserve blocks, where reserve blocks can be used to create an assignable pool of blocks that can be used to selectively boost performance. In some implementations, regular, non-overprovisioned blocks may also be used as a source for reserve blocks. For example, the data storage device may go below its stated capacity by re-allocating normal memory blocks as reserve blocks. This would reduce the available capacity of the data storage device, but may enable improved performance.

In addition, in some embodiments, a user interface for a storage manager can be configured to enable the user to select from specific boosts to different performance characteristics of the SSO. By selectively utilizing the reserve blocks for different purposes, the storage device can boost performance (e.g., write performance, endurance or capacity), based on the desires of the user.

An SSD may have to use one or a combination of different types of memory blocks or cells. There are several types of NAND flash memory cells, each with different characteristics and performance capabilities. The most common types of NAND flash memory cells are Single-Level Cell (SLC), Multi-Level Cell (MLC), Triple-Level Cell (TLC), and Quad-Level Cell (QLC). Even denser variants may become available in the future. MLC can sometimes be used to refer specifically to two-level cells, but may also be used to refer generically to two or more level cells, such as TLC or QLC.

SLC is the simplest type of NAND flash memory cell, storing one bit of data per cell. SLC flash memory provides fast read and write speeds, low power consumption, and high endurance. However, it is also the most expensive type of NAND flash memory, due to its lower density and higher manufacturing costs.

MLC is a more complex type of NAND flash memory cell, storing two bits, or more, of data per cell. MLC flash memory offers higher density and lower manufacturing costs for the size than SLC, but it also has lower endurance and slower write speeds. MLC flash memory is widely used in consumer electronics, such as digital cameras and universal serial bus (USB) drives.

TLC is a further development of MLC flash memory, storing three bits of data per cell. TLC flash memory provides even higher density and lower costs for the size than two-level MLC, but it also has lower endurance and slower read and write speeds. TLC flash memory is commonly used in consumer devices, such as smartphones and tablets.

In addition to these main types of NAND flash memory cells, there are also newer types of memory cells, such as QLC and PLC (Penta-Level Cell). QLC flash memory stores four bits of data per cell, while PLC flash memory stores five bits of data per cell. These types of flash memory offer even higher density and lower costs for the size than TLC, but they also have even lower endurance and slower read and write speeds.

Overall, the choice of NAND flash memory cell type to include in a data storage device can depend on the specific application for that data storage device. SLC cells are the most suitable for high-performance applications, while MLC, TLC and higher density cells are more appropriate for mass data storage.

The following describes devices and methods that enable the selective assignment of reserve blocks to boost a particular performance aspect of a data storage device. In one scenario, the storage device is configured to track and store the types of cells available in the storage device, along with their respective performance characteristics. When initialized during connection with a host system, the storage device may apply reserve blocks according to a selected or default storage mode. The reserve blocks can be used to boost capacity, boost read/write performance, boost endurance, or boost a combination therein of the data storage device.

Storage Modes for a Storage Device

Figure 1B:
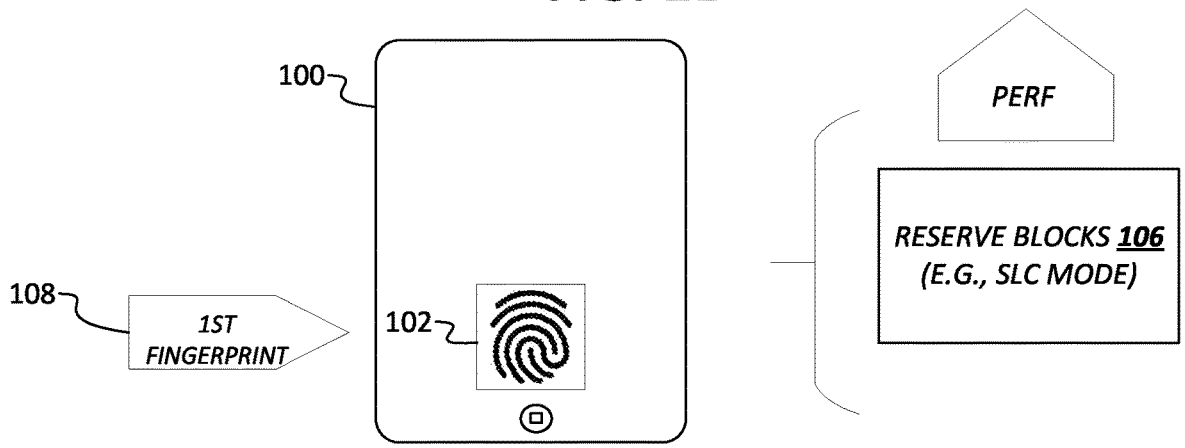
Figure 1C:
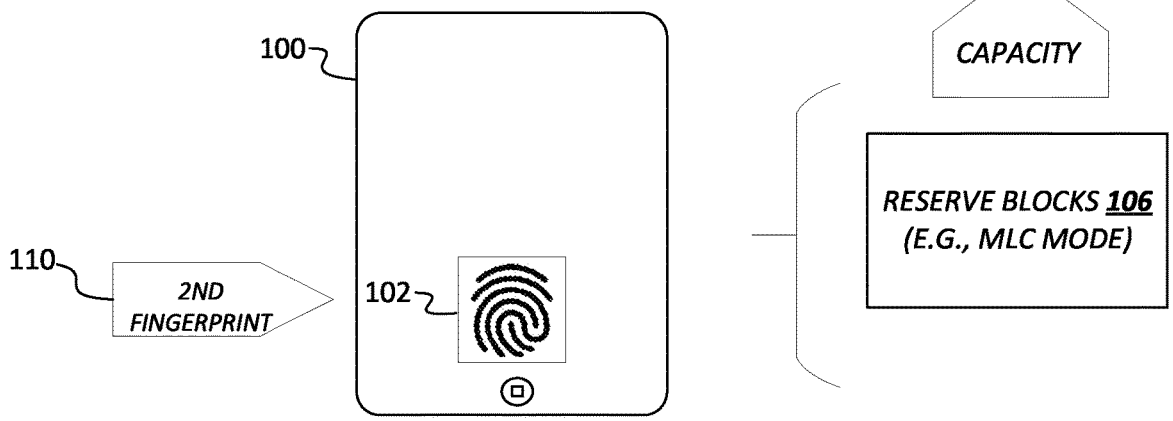

FIGS. 1A-1C are diagrams illustrating various configurations of a data storage device 100 that has reserve blocks that can be used to boost different performance levels, according to certain embodiments. In some embodiments, the data storage device 100 includes a fingerprint sensor or scanner 102 for detecting fingerprints. The fingerprint sensor 102 may be formed on an external surface of an enclosure of the data storage device 100. For example, the data storage device 100 may be an external storage drive, with a displayless enclosure, with a data port (e.g., USB) and the fingerprint sensor 102 formed on the outside of the enclosure.

Fingerprint scanners are biometric devices that capture and analyze the unique patterns on an individual's fingerprint to authenticate their identity. The scanner 102 can capture an image of the fingerprint using different techniques such as optical, capacitive, or ultrasonic methods. This image can then be processed to enhance its quality, correct distortions, and extract key features. Features like ridge endings, bifurcations, orientations, and minutiae can be extracted to create a mathematical representation called a fingerprint template.

The fingerprint template contains the unique characteristics of the fingerprint and serves as a reference for comparison. The template is stored securely, in the data storage device 100. This enables matching without storing the actual fingerprint image for privacy and security reasons. When a user attempts to authenticate, their fingerprint is scanned again, and a new template is created. This new template is then compared to the stored templates using matching algorithms.

During the matching process, the system compares the newly created template with the stored templates to find a match. Various factors, such as the level of similarity or dissimilarity, are considered to determine if the authentication is successful. If the match falls within a predefined threshold, the authentication is considered successful. However, if there is no significant match, the authentication is rejected, and access is denied. While the above has described using templates, matching fingerprints may also be accomplished by storing actual fingerprints or parts of fingerprints, or using other data derived from fingerprints.

In addition, the data storage device 100 has at least two storage modes. Different fingerprints of a user can be associated with different storage modes, such that the user can quickly and easily set the storage mode of the data storage device 100 using a particular fingerprint.

In addition, the fingerprint scanner 102 may also be used to authenticate the user and provide access to the data storage device 100. For example, access to the contents may be locked until authentication is received. In some implementations, the storage device 100 may be encrypted and authenticating with a fingerprint causes the data storage device 100 to decrypt its contents.

As shown in FIG. 1A, the data storage device includes a first set of memory blocks 104 and a reserve set of memory blocks 106. The reserve blocks 106 may, for example, be overprovisioned memory that is not part of the stated capacity of the data storage device. For example, a one terabyte (TB) drive may have an extra 150 gigabytes (GB) of overprovisioned memory. The reserve blocks 106 may be hybrid memory cells that can work as SLC or MLC.

Hybrid memory cells are a type of NANO flash memory cell that can work as both SLC and memory with 2+ levels. For ease of reference, the hybrid cells when storing 2+ levels are referred to as operating in MLC mode, with the term MLC mode not limited to referring to cells storing only 2 bits. The cells may be storing 3 bits (performing as TLC memory), 4 bits (performing as QLC memory), or storing even more bits. These hybrid cells combine the benefits of SLC and MLC flash memory, providing a balance of performance, endurance, and cost.

In the example hybrid memory cell, the cell can be programmed to store either one bit of data (SLC) or two bits or more of data (MLC). The cell operates as SLC when storing a single bit of data and as MLC when storing two bits or more of data. This is achieved by using more precise voltage levels to distinguish between the two states.

The benefit of hybrid memory cells is that they can provide higher endurance and faster write speeds compared to standard MLC flash memory. SLC flash memory has higher endurance than MLC, but it is more expensive and has lower density. Hybrid memory cells can provide higher endurance than MLC by reducing the number of write cycles per cell when operating in SLC mode, while still providing a higher density than SLC.

Another benefit of hybrid memory cells is their ability to provide a balance between cost and performance. SLC flash memory provides the highest performance and endurance, but it is also the most expensive. MLC flash memory provides lower performance and endurance, but it is more cost-effective. Hybrid memory cells provide a balance between the two by providing higher performance and endurance than MLC, but at a lower cost than SLC.

FIGS. 1B and 1C illustrate the two storage modes associated with a particular fingerprint. In the illustrated figures, the data storage device 100 associates a first fingerprint 108 with a first performance mode and a second fingerprint 110 with a second performance mode. Fingerprints may be obtained from a little, ring, middle, index, or thumb of the user. As discussed above, templates can be stored on the data storage device 100 for each fingerprint, with a specific fingerprint template associated with a specified storage mode.

In FIG. 1B, the data storage device 100 receives a first fingerprint 108 on the fingerprint scanner 102. The data storage device 100 determines first fingerprint 108 matches a stored template of the first fingerprint and activates the associated storage mode, which in this case is the first storage mode.

In one implementation, the first storage mode causes performance to increase. The first storage mode can include assigning the reserve blocks 106 to boost write or read performance. For example, the reserve blocks 106 may be hybrid blocks that are put into SLC mode. The reserve blocks 106 would generally have better performance than the memory blocks 104, so would bring up the overall performance of the storage device 100. In some implementations, the reserve blocks 106 may be used as a cache or buffer to speed up the performance of reads/writes from the slower memory blocks 104. For example, the reserve blocks 106 may serve as a write cache, with writes getting first written to the reserve blocks 106 as the reserve blocks have faster write performance. The written data in the reserve blocks 106 may then be moved to the memory blocks 104 at a later time, freeing up space in reserve blocks 106 for further write caching.

In FIG. 1C, the data storage device 100 receives a first fingerprint 110 on the fingerprint scanner 102. The data storage device 100 determines second fingerprint 110 matches a stored template of the second fingerprint and activates the associated storage mode, which in this case is the second storage mode.

In one implementation, the second storage mode causes capacity to increase. The second storage mode can include assigning the reserve blocks 106 to boost capacity. For example, the reserve blocks 106 may be hybrid blocks that are put into MLC mode. The reserve blocks 106 can provide additional storage space to the memory blocks 104, increasing the overall capacity of the data storage device 100.

Figure 2:
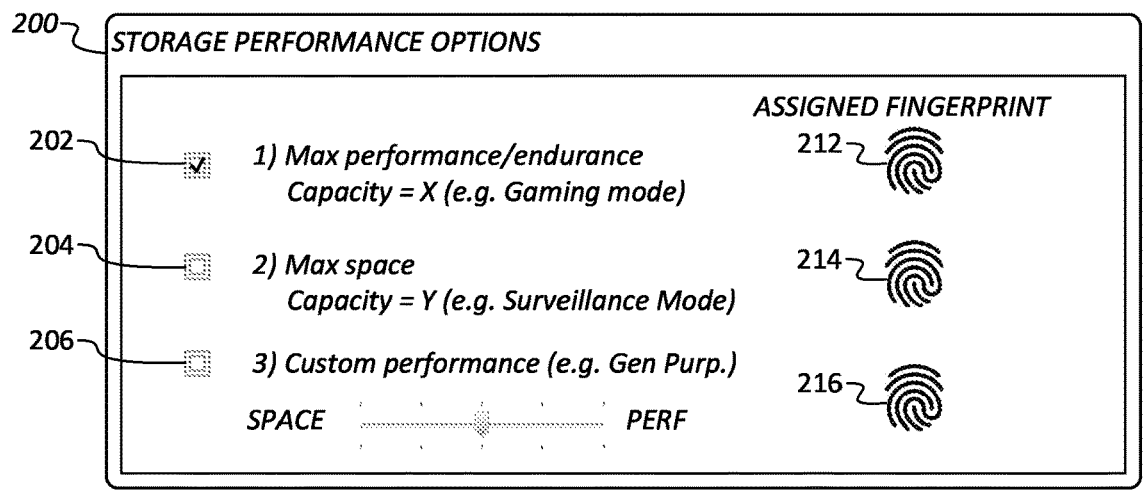
FIG. 2 illustrates a user interface screen for choosing a performance boost that can be displayed by a storage device manager, according to certain embodiments.

FIG. 2 illustrates a user interface screen 200 for choosing a performance boost that can be displayed by a storage device manager, according to certain embodiments. In the illustrated embodiment, the user interface screen 200 provides options for a user to select performance boosts to the storage device. These performance boosts may be associated with storage modes. For example, the user may be given an option to select a first storage mode 202, where the first storage mode emphasizes performance and/or endurance. These boosts may require limiting capacity to a smaller size (e.g., capacity=x) than the other options (e.g., capacity=y, where y>x). The first storage mode may be enabled by configuring additional memory cells, such as from a set of reserve blocks, into a performance mode. In some embodiments, this option can involve putting hybrid cells into SLC mode, which typically increases read/write performance and endurance.

A second storage mode 204 option that can be provided to the user is to maximize space over performance. Reserve blocks may be configured to store the maximum number of bits possible and used for storage, rather than other uses. In some embodiments, this option can involve putting hybrid cells into MLC mode. This type of storage mode can be useful for media storage, backup, surveillance recording, or other activities that require storing a lot of data.

A third option that can be provided by user interface screen 200 is to create a third storage mode 206 with a custom performance boost that enables a user to select a ratio to allocate reserve blocks to boost performance or capacity. In the illustrated embodiment, a slider that can be moved between "SPACE" and "PERF" represents this selectable ratio. However, other types of interfaces can be used, such as a graphical icon, or a numerical entry field. Sliding the slider towards "SPACE" increases the number of high-density cells, while sliding towards "PERF" increase the number of high performance cells. In some embodiments, the slider causes more hybrid memory cells to be put into MLC mode when prioritizing "SPACE" and more hybrid memory cells to be put into SLC mode when prioritizing "PERF." With more hybrid cells being placed in SLC mode, there is less space overall. As the hybrid cells in SLC mode store half or even less of the data compared to hybrid cells in MLC mode, the overall capacity of the data storage device 100 decreases.

Furthermore, the user interface screen 200 can enable the user to associate specific fingerprints with a particular storage mode. In the illustrated example, a first fingerprint 212 is associated with the first storage mode 202, a second fingerprint 214 is associated with the second storage mode 204, and a third fingerprint 216 is associated with the third storage mode 206.

Figure 3A:
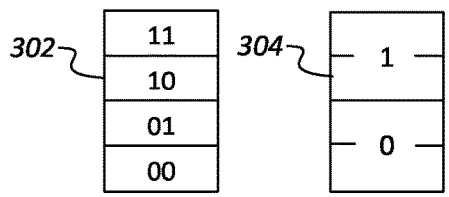
FIG. 3A illustrates a logical representation of a hybrid memory cell, according to certain embodiments.

FIG. 3A illustrates a logical representation of a hybrid memory cell, according to certain embodiments. In two-level MLC mode 302, the hybrid memory cell can distinguish between two bits of data. The voltage level of the hybrid cell can be determined to be one of four different levels, representing either 00, 01, 10, or 11. In SLC mode 304, the hybrid memory cell is only used to track a single bit represented by two different voltage levels, corresponding to 0 or 1. Reading and writing to the hybrid memory cell by detecting and setting the voltage level does not need to be as precise, enabling the detecting and the setting of the voltage level to be performed faster. However, this benefit is obtained by reducing the overall amount of data that can be stored. Where the hybrid memory cell in MLC mode can store two bits of data, it takes two hybrid memory cells in SLC mode to store the same two bits of data.

As will be apparent, as technology develops, hybrid cells with greater capacities will become available. For example, hybrid cells may be able to operate in TLC mode (3 bits of data) or QLC mode (4 bits of data). These types of hybrid cells may also be used with the described methods and systems. These types of multi-level hybrid cells may generally be referred to as operating in MLC mode, and the term MLC mode is not limited to two-level MLC mode that stores only two bits.

Hybrid memory cells can perform in multiple modes. The hybrid memory cells may be MLC, SLC, or QLC cells that can function in SLC mode. For example, SLC mode for TLC memory can refer to a configuration in which TLC flash memory cells are operated in a SLC-like manner. TLC memory cells are typically designed to store three bits of data per cell, offering higher density and cost efficiency but sacrificing some performance and endurance compared to SLC or MLC memory.

Figure 3B:
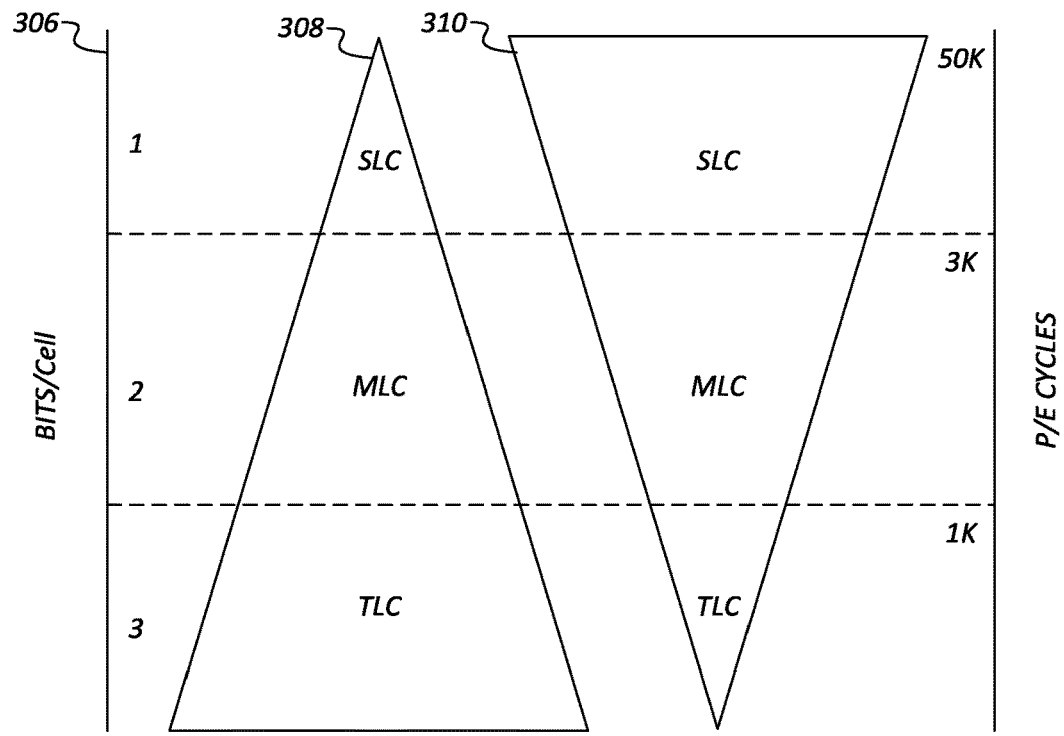
FIG. 3B illustrates a chart representing the performance versus the capacity of various types of memory cells, according to certain embodiments.

FIG. 3B illustrates a chart 306 representing the performance versus the capacity of various types of memory cells, according to certain embodiments. As shown by the triangle

308 on the left, SLC stores 1 bit per cell, two-level MLC stores 2 bits per cell, and TLC stores 3 bits per cell. For a desired storage capacity for a storage device, using SLC memory cells would be the most expensive, using MLC memory cells would be less expensive than using SLC, and using TLC memory cells would be even less expensive than MLC.

However, using denser memory typically comes at the costs of performance. As shown by inverted triangle 310, the denser memory generally has lower endurance, capable of lasting for lesser amounts of program/erase (P/E) cycles. A P/E cycle is an event in which data is written to a solid-state NAND flash memory cell and is subsequently erased and rewritten. For example, TLC may only be capable of surviving around 1000 P/E cycles, MLC may last about 3000 P/E cycles, while SLC may survive 50,000 P/E cycles. These values are representative values; actual values of specific types of memories can vary based on technology and manufacturer. Nevertheless, the denser memory cells tend to have a significant reduction in endurance. In addition, denser memory cells may also perform worse in terms of read and/or write performance than less dense cells (e.g., SLC).

Figure 4:
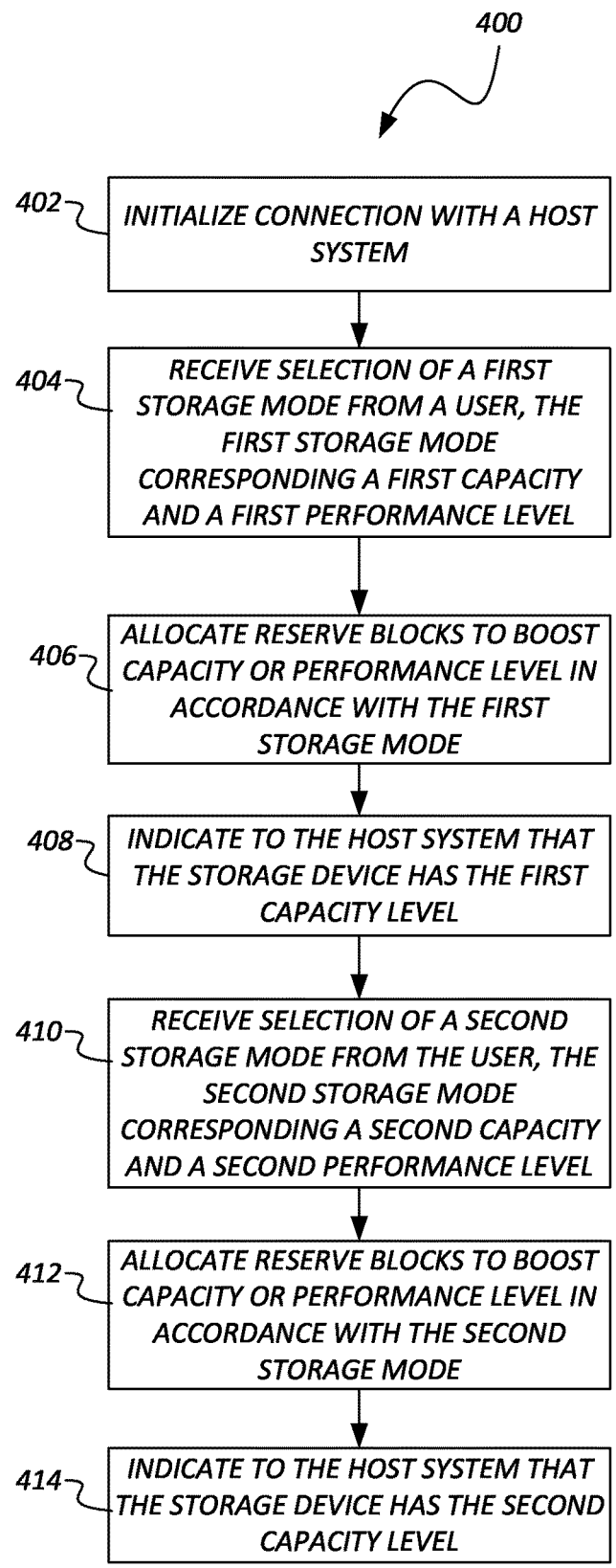
FIG. 4 illustrates a block diagram representing a performance boosting process performed by a data storage device 100, according to certain embodiments.

FIG. 4 illustrates a block diagram representing a performance boosting process 400 performed by a data storage device 100, according to certain embodiments. The data storage device 100 may be connected with a host system. For example, the data storage device 100 may be an internal drive in the same enclosure as the host system or an external drive in a separate enclosure from the host system and connected to a data interface of the host system by a cable. For ease of reference, the following discusses the performance boosting process in reference to the data storage device 100 of FIGS. 1A-1C, though it can be adapted to work with other types of storage devices, such as hard disk drives (HDDs) or solid state hybrid drives (SSHDs). Furthermore, the process may be performed by the data storage device 100, or one of its components, such as control circuitry or controller.

At block 402, the data storage device 100 initializes a connection with a host system. Prior to this, the data storage device 100 may be connected by the user to a data interface of the host system. The data interface may be a USB port on the host system, connected by a USB cable to another USB port on the data storage device 100. Other types of data interfaces can also be used, such as Lightning, Thunderbolt, or external serial ATA (eSATA). In some examples, the data storage device 100 may be an internal drive that is connected to an internal bus of the host system, such as nonvolatile memory express (NVMe), or serial ATA (SATA). In these examples, the internal storage drive is installed within a chassis of the host system, connected to the data interface, and connected to a power source of the host system, as internal drives do not have an internal power source, such as a battery.

Initializing the connection may involve a handshake or other negotiation process. For example, USB devices utilize USB enumeration to establish a connection. USB enumeration is a process that takes place when a USB device is connected to a computer or other host system. Upon connection, the USB controller on the host system detects the device and establishes its power requirements. The controller then communicates with the device to determine its supported USB speed, such as USB 2.0 or USB 3.0. Next, the USB device provides its Vendor ID (VID) and Product ID (PID) to the host, which helps the operating system (OS) identify the device and locate the appropriate device drivers.

The OS then checks its driver database and either prompts the user for driver installation or automatically installs the necessary driver for the device. Such a driver may be configured to enable the performance boosting process 400 to be performed by the host system. Once the driver is loaded, the host OS configures the USB device by assigning resources and determining its capabilities. Endpoint allocation can then take place, where the host OS assigns logical channels (endpoints) for data transfer based on the device's defined interfaces. The OS notifies relevant applications or services about the connected device, enabling them to interact with the device using the appropriate Application Programming Interface (API).

With the enumeration process complete, the USB device and the host computer are ready to exchange data through the allocated endpoints, utilizing the suitable USB protocols. USB enumeration ensures proper device identification, driver installation, and configuration, enabling effective communication and functionality between the USB device and the computer.

At block 404, the data storage device 100 receives a selection of a first storage mode from a user. The selection may be made by a fingerprint sensor, or via a user interface of an application, such as a storage manager. The first storage mode corresponds to a first capacity and a first performance level. For example, the first storage mode may be for a gaming mode that emphasizes read/write performance and/or endurance.

Games primarily utilize a combination of sequential and random access patterns when reading data from a data storage device, such as an SSD. Sequential access is commonly employed during initial loading phases or level transitions. Games often organize their data in a sequential manner, enabling efficient streaming of assets, such as textures, models, or audio files, in a continuous stream. Games also require random access for various operations during gameplay. For example, when a player interacts with the environment, the game needs to retrieve specific data associated with the object or entity being interacted with. Random access enables quick retrieval of these specific assets, such as retrieving the properties of a character, accessing the attributes of an object, or loading a particular sound effect. In these cases, the game makes targeted requests to the SSD for the required data, bypassing the need to sequentially read through unrelated information.

To optimize performance, games may preload frequently accessed data into memory or use caching mechanisms, both at the software and hardware level, to minimize the impact of random access delays. Additionally, games may employ predictive algorithms to anticipate the next required data and prefetch it from the SSD, reducing latency and improving responsiveness.

At block 406, the data storage device 100 allocates the reserve blocks to boost the capacity or performance level in accordance with the first storage mode. Assuming the first storage mode is the gaming mode, the first storage mode may employ reserve blocks to increase performance. For example, the reserve blocks may be used to create a cache of memory cells operating in SLC mode so that the fastest available memory in the data storage device 100 is used for a game's caching mechanism. The reserve blocks may also be used to store prefetched data, or to enlarge existing cache capacity.

At block 408, the data storage device 100 indicates to the host system that the storage device has the first capacity level associated with the first storage mode. This may require re-initialization of the data storage device 100 to change the capacity. For example, during the USB enumeration, the data storage device 100 may provide capacity descriptors to the host that report the size and logical block address (LBA) of the storage medium of the data storage device 100. Entering the first storage mode may lead to a change in capacity that is reported to the host system via a re-initialization.

At block 410, the data storage device 100 receives a selection of a second storage mode from the user. The selection may be made via the fingerprint sensor, or via an application like the storage manager. The second storage mode corresponds to a second capacity and a second performance level. For example, the second storage mode may be for a media storage mode that emphasizes capacity. Typically, the second storage mode provides a different capacity and/or performance level than the first storage mode.

At block 412, the data storage device 100 allocates the reserve blocks to boost the capacity or performance level in accordance with the second storage mode. Assuming the second storage mode is the media storage mode, the second storage mode may employ reserve blocks to increase capacity. For example, the reserve blocks may be placed in MLC mode and added to an existing storage partition so that the available capacity of the data storage device 100 is increased.

At block 414, the data storage device 100 indicates to the host system that the storage device has the second capacity level associated with the second storage mode. This may require re-initialization of the data storage device 100 to change the capacity. The host system may then use the data storage device 100 to perform various read and write operations. If a different storage mode is needed by the user, the user can change the storage mode of the data storage device 100 as needed.

Figure 5:
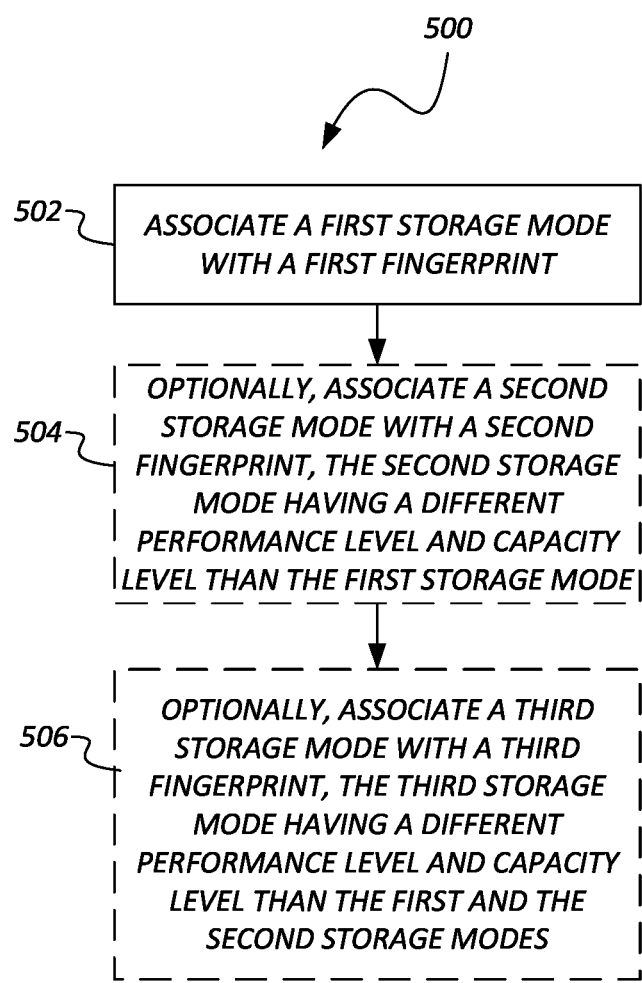
FIG. 5 illustrates a block diagram representing a fingerprint recording process performed by the data storage device, according to certain embodiments.

FIG. 5 illustrates a block diagram representing a fingerprint recording process 500 performed by the data storage device 100, according to certain embodiments. The data storage device 100 can include a fingerprint scanner for receiving fingerprints. For ease of reference, the following discusses the performance boosting process in reference to the data storage device 100 of FIGS. 1 A-1 C, though it can be adapted to work with storage devices other than SSDs, such as HDDs or SSHDs. Furthermore, the process may be performed by the data storage device 100, or one of its components, such as control circuitry or a controller.

At block 502, the data storage device 100 associates a first storage mode with a first fingerprint. As discussed above, the data storage device may have several storage modes that emphasize particular aspects based on the intended use of the storage device. For example, if the user is intending to play games that are stored on the storage device, the user may select a gaming mode that emphasizes performance.

By using fingerprints to select between modes, the user is able to quickly change between storage modes. For example, rather than opening an application or other user interface to select the storage mode, which may take tens of seconds or even a few minutes, the user can simply touch the sensor with the appropriate finger associated with the desired storage mode. The user can also quickly switch to a different storage mode simply by touching the fingerprint sensor with a different finger with a different fingerprint associated with a different storage mode.

Associating the first fingerprint can involve creating a template or other recording of the first fingerprint from the user. For example, the user may record their fingerprint using a fingerprint sensor of the storage device. The template can then be stored in a database, datastore, or other data structure. The data storage device 100 may store several fingerprints. The data storage device 100 may also store different sets of fingerprints for different users, enabling different users to create different selections of storage modes. For example, a first user may be concerned with use cases boosting performance and have storage modes that are focused on that. Meanwhile, a second user may be concerned with use cases boosting capacity and have storage modes that are focused on that.

At block 504, the data storage device 100 optionally associates a second storage mode with a second fingerprint. For example, if the user is intending to store video or other media on the storage device, the user may select a media storage mode that emphasizes capacity. Similarly, if the user is intending to store data backups, the user may select a backup storage mode that emphasizes capacity. Associating the second fingerprint can involve creating a template or other recording of the second fingerprint from the user.

At block 506, the data storage device 100 optionally associates a third storage mode with a third fingerprint. For example, if the user is intending to use the device for a mix of activities, the user may select a general purpose storage mode that balances between capacity and performance. Associating the third fingerprint can involve creating a template or other recording of the third fingerprint from the user.

Example Storage Device and Host System

Figure 6:
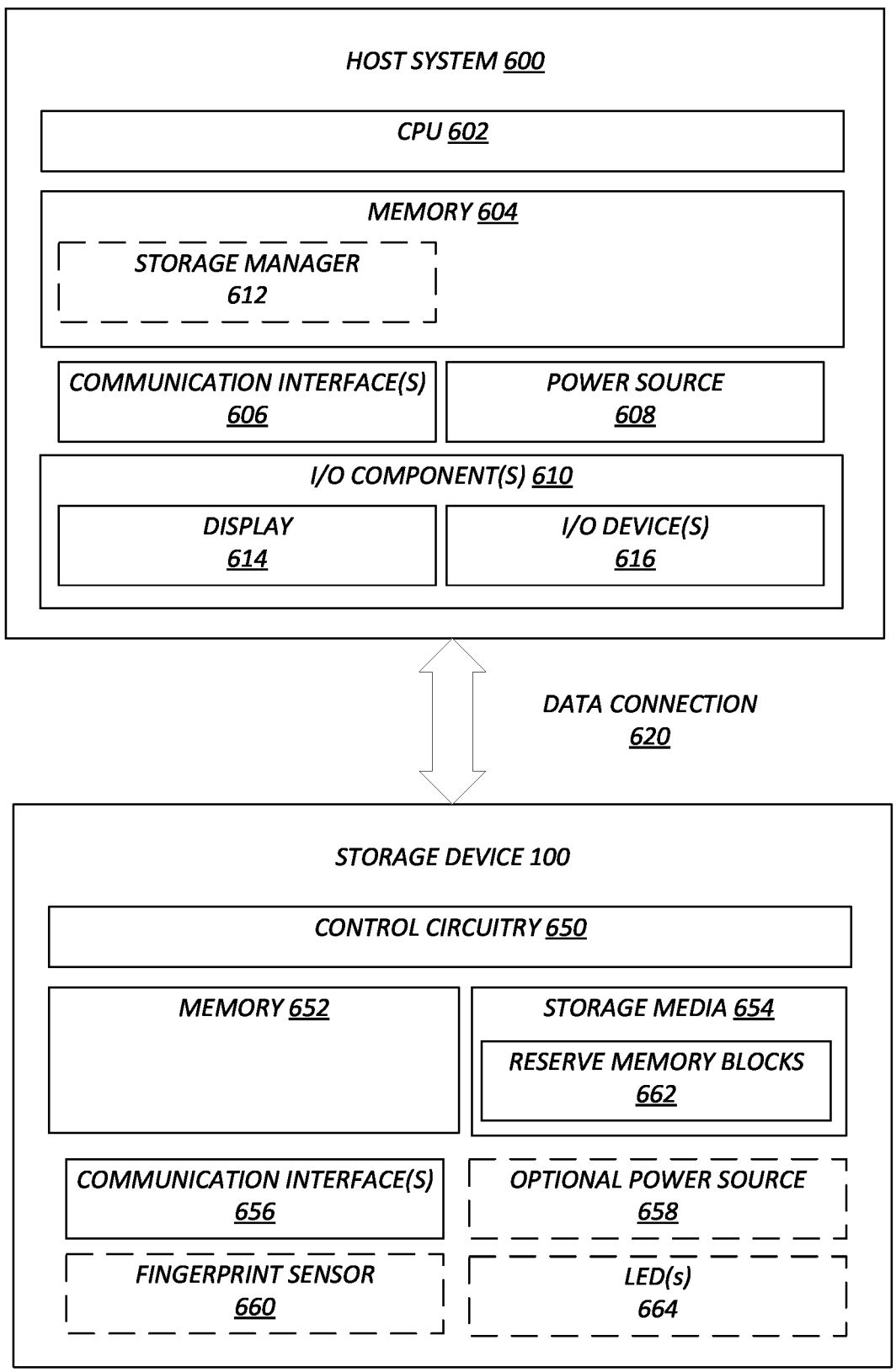
FIG. 6 illustrates example details of the storage device and a host system, according to certain embodiments.

FIG. 6 illustrates example details of the data storage device 100 and a host system 600, according to certain embodiments. As illustrated, the host system 600 can include one or more of the following components, devices, modules, and/or units (referred to herein as "components"), either separately/individually and/or in combination/collectively: central processing unit (CPU) 602 or other type of processor, memory 604, communication interfaces 606, a power source 608 (e.g., battery or power supply unit), and/or one or more I/O components 610.

In some embodiments, the host system 600 can comprise a housing/enclosure configured and/or dimensioned to house or contain at least part of one or more of the components of the host system 600. In some embodiments, the data storage device 100 may be housed internally in the enclosure of the host system 600. For example, the host system 600 may be a server or desktop system in case or rack mount enclosure with one or more storage drives in the case or enclosure. The data storage device 100 may also be an external drive that is connected to the host system 600 via an external port, such as USB.

The memory 604 can employ a variety of storage technologies and/or form factors and can include various types of volatile memory, such as Random Access Memory (RAM). RAM is a type of computer memory that serves as a temporary storage area for data and instructions that are actively being used by a computer's operating system, applications, and processes. RAM is volatile memory, meaning that its contents are lost when the computer is powered off or restarted. RAM provides fast and temporary access to data, enabling the CPU 602 to quickly retrieve and manipulate the information it needs to perform tasks.

The memory 604 can include programs that are running on the host system 600, such as a storage manager 612. The storage manager 612 may be a program configured to associate fingerprints with storage modes, define storage modes, and/or select between storage modes for the data storage device 100. In addition, the host system 600 may also include non-volatile memory for permanently storing data. For example, the data storage device 100 may be an internal drive that is installed within the host system 600 housing or the host system 600 may include a separate storage drive different from the data storage device 100.

The one or more communication interfaces 606 can be a data interface that includes connectors, cables, and/or protocols for connection, communication, and/or power supply between host devices and the data storage device 100. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 100, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the data storage device 100, forming a data connection 620 with the data storage device 100.

The power source 608 can be configured to provide/manage power for the host system 600. The power source 608 can comprise one or more devices and/or circuitry configured to provide a source of power and/or provide power management functionality. Moreover, in some embodiments the power source 608 includes a mains power connector that is configured to couple to an alternating current (AC) or direct current (DC) mains power source. In some embodiments, the power source can include one or more batteries, such as a lithium-based battery, a lead-acid battery, an alkaline battery, and/or another type of battery.

The one or more I/O components 610 can include a variety of components to receive input and/or provide output. The one or more I/O components 610 can be configured to receive touch, speech, gesture, biometric data, or any other type of input. In examples, the one or more I/O components 610 can be used to provide input regarding control of the host system 600, such as opening files, entering logins, plays, and/or changing settings. As shown, the one or more I/O components 610 can include the one or more displays 614 configured to display data and various user interfaces. The display 614 can include one or more liquid-crystal displays (LCD), light emitting diode (LED) displays, organic LED displays, plasma displays, and/or electronic paper displays. In some embodiments, the display 614 can include one or more touchscreens configured to receive input and/or display data. Further, the one or more I/O components 610 can include the one or more input/output devices 616, which can include a touchscreen, touch pad, controller, mouse, keyboard, wearable device (e.g., optical head-mounted display), virtual or augmented reality device (e.g., head-mounted display), etc.

As illustrated, the data storage device 100 can include one or more of the following components, devices, modules, and/or units (referred to herein as "components"), either separately/individually and/or in combination/collectively: control circuitry 650, memory 652, storage media 654, communication interfaces 656, optionally a power source 658 (e.g., battery or power supply unit), optionally a fingerprint sensor 660, and/or optionally one or more LEDs 664. In some embodiments, the data storage device 100 can comprise a housing/enclosure configured and/or dimensioned to house or contain the components of the data storage device 100.

The data storage device 100 may be a solid-state drive (SSD), Secure Digital (SD) card, or a universal serial bus memory stick that uses semiconductor memory as the storage media. In other implementations, the data storage may be a hard disk drive that uses magnetic disks as the storage media or a solid-state hybrid drive that uses a combination of semiconductor memory and magnetic disk technology.

Although certain components of the data storage device 100 and host system 600 are illustrated in FIG. 6, it should be understood that additional components not shown can be included in embodiments in accordance with the present disclosure. Furthermore, certain of the illustrated components can be omitted in some embodiments. Although the control circuitry 650 is illustrated as a separate component, it should be understood that any or all of the remaining components of the data storage device 100 can be embodied at least in part in the control circuitry 650. That is, the control circuitry 650 can include various devices (active and/or passive), semiconductor materials and/or areas, layers, regions, and/or portions thereof, conductors, leads, vias, connections, and/or the like, wherein one or more of the other components of the data storage device 100 and/or portion(s) thereof can be formed and/or embodied at least in part in/by such circuitry components/devices.

The various components of the data storage device 100 can be electrically and/or communicatively coupled using certain connectivity circuitry/devices/features, which can or may not be part of the control circuitry 650. For example, the connectivity feature(s) can include one or more printed circuit boards configured to facilitate mounting and/or interconnectivity of at least some of the various components/circuitry of the data storage device 100. In some embodiments, two or more of the control circuitry 650, the memory 652, the storage media 654, the communication interface(s) 656, the power source 658, the fingerprint sensor 660, and/or the LEDs 664 can be electrically and/or communicatively coupled to each other.

The storage media 654 can utilize various types of non-volatile memory (NVM) to permanently store data. NVM is a type of computer memory that can retain stored information even after power is removed. For example, the storage media 654 can include one or more magnetic disks and/or semiconductor memory. The semiconductor memory can include any of various memory technologies, such as NAND memory and its variations like SLC, eMLC (Enterprise Multi Level Cell), MLC, TLC, and QLC. New types of emerging non-volatile memory could also be used such as Program in Place or Storage Class Memory (SCM) such as ReRam, Phase-Change Memory (PCM), and Magnetoresistive Random-Access Memory (MRAM).

A portion of the storage media 654 may comprise of reserve memory blocks 662 that are under the control of the storage device 100 control circuitry. When SSDs are over-provisioned, a certain amount of memory blocks are reserved and not made accessible to the user. These blocks are used for various purposes, including wear leveling, garbage collection, and error correction. In some embodiments, at least a portion of the reserve memory blocks 662 are used by the data storage device to boost performance, such as by improving read/write performance, endurance, or capacity.

The one or more communication interfaces 656 can be configured to communicate with one or more device/sensors/systems. For example, the one or more communication interfaces 656 can send/receive data over a network. A network in accordance with embodiments of the present disclosure can include a local area network (LAN), wide area network (WAN) (e.g., the Internet), personal area network (PAN), body area network (BAN), etc.

The one or more communication interfaces 656 can be a data interface that includes connectors, cables, and/or protocols for connection, communication, and/or power supply between the host system 600 and the data storage device 100. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 100, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the host system 600, forming the data connection 620.

The power source 658 can be configured to provide/manage power for the data storage device 100. In some embodiments, the power source can include one or more batteries, such as a lithium-based battery, a lead-acid battery, an alkaline battery, and/or another type of battery. In some embodiments the power source 658 includes a mains power connector that is configured to couple to an alternating current (AC) or direct current (DC) mains power source. However, in some embodiments, the data storage device 100 may not include an internal power source but be configured to receive power through the communication interface 656, such as via a USB connection.

As discussed above, the fingerprint sensor 660 can be used to capture and/or authenticate fingerprints. Based on the fingerprints, the associated storage mode can be selected for the data storage device 100. In addition, the LEDs 664 can be used to indicate to the user the current storage mode. For example, a first color (e.g., blue) may be used to indicate a first storage mode (e.g., gaming mode), and a second color (e.g., green) may be used to indicate a second storage mode (e.g., media storage mode). These colors may be default colors or may be set by the user. As the data storage device 100 typically does not have a display, the LEDs 664 provide the user with a way to determine the storage mode and to know when the storage mode has been successfully changed.

The term "control circuitry" is used herein according to its broad and ordinary meaning, and can refer to any collection of one or more processors, processing circuitry, processing modules/units, chips, dies (e.g., semiconductor dies including come or more active and/or passive devices and/or connectivity circuitry), microprocessors, micro-controllers, digital signal processors, microcomputers, central processing units, graphics processing units, field programmable gate arrays, programmable logic devices, state machines (e.g., hardware state machines), logic circuitry, analog circuitry, digital circuitry, and/or any device that manipulates signals (analog and/or digital) based on hard coding of the circuitry and/or operational instructions. Control circuitry can further comprise one or more storage devices, which can be embodied in a single memory device, a plurality of memory devices, and/or embedded circuitry of a device. Such data storage can comprise read-only memory, random access memory, volatile memory, non-volatile memory, static memory, dynamic memory, flash memory, cache memory, data storage registers, and/or any device that stores digital information. It should be noted that in embodiments in which control circuitry comprises a hardware state machine (and/or implements a software state machine), analog circuitry, digital circuitry, and/or logic circuitry, data storage device(s)/register(s) storing any associated operational instructions can be embedded within, or external to, the circuitry comprising the state machine, analog circuitry, digital circuitry, and/or logic circuitry.

The term "memory" is used herein according to its broad and ordinary meaning and can refer to any suitable or desirable type of computer-readable media. For example, computer-readable media can include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other types of data.

Computer-readable media that can be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media.

Additional Embodiments

Those skilled in the art will appreciate that in some embodiments, other types of storage devices can be implemented while remaining within the scope of the present disclosure. In addition, the actual steps taken in the processes discussed herein may differ from those described or shown in the figures. Depending on the embodiment, certain of the steps described above may be removed, others may be added, and the order may be rearranged.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device comprising:
   storage media comprising:
      a first set of memory blocks at a first capacity level and a first performance level; and
      a reserve set of memory blocks; and
   control circuitry configured to:
      in response to receiving a first selection associated with a first storage mode from a user, allocate the reserve set of memory blocks to provide a second performance level greater than the first performance level, wherein the second performance level comprises at least one of faster write speed and greater endurance in comparison to the first performance level;
      in response to receiving a second selection associated with a second storage mode from the user, allocate the reserve set of memory blocks to provide a second capacity level greater than the first capacity level; and
      in response to receiving a third selection associated with a third storage mode from the user, allocate the reserve set of memory blocks to provide a third performance level and a third capacity to either balance or prioritize performance or capacity based on a ratio indicated by a user using an open sliding scale.

2. The data storage device of claim 1, wherein the reserve set of memory blocks comprises hybrid memory cells configured to operate in either single-level cell (SLC) mode or multi-level cell (MLC) mode.

3. The data storage device of claim 2, wherein:
   allocating the reserve set of memory blocks to provide the second performance level comprises configuring the hybrid memory cells to operate in SLC mode; and
   allocating the reserve set of memory blocks to provide the second capacity level comprises configuring the hybrid memory cells to operate in MLC mode.

4. The data storage device of claim 1, the data storage device further comprising a fingerprint sensor formed on an external surface of an enclosure of the data storage device.

5. The data storage device of claim 4, wherein receiving the selection of the first storage mode from the user comprises:
   receiving a first fingerprint on the fingerprint sensor; and
   determining that the first fingerprint is associated with the first storage mode.

6. The data storage device of claim 5, wherein receiving the selection of the second storage mode from the user comprises:
   receiving a second fingerprint on the fingerprint sensor; and
   determining that the second fingerprint is associated with the second storage mode.

7. The data storage device of claim 1, wherein:
   receiving the selection of the first storage mode from the user comprises receiving, on a user interface associated with the data storage device, the selection of the first storage mode; and
   receiving the selection of the second storage mode from the user comprises receiving, on the user interface associated with the data storage device, the selection of the second storage mode.

8. The data storage device of claim 1, the data storage device further comprising a communication port configured to be physically connected to a host system.

9. The data storage device of claim 8, wherein the communication port comprises a universal serial bus (USB) port that is further configured to provide power to the data storage device.

10. The data storage device of claim 1, wherein the data storage device is a solid state drive (SSD) and the reserve set of memory blocks comprise overprovisioned memory blocks.

11. The data storage device of claim 1, further comprising one or more light emitting diodes (LEDs), the control circuitry further configured to:
    indicate the first storage mode is active by causing the one or more LEDs to display a first color; and
    indicate the second storage mode is active by causing the one or more LEDs to display a second color.

12. A method for boosting either capacity or performance of a data storage device, the method comprising:
    initializing a connection between a host system and a data storage device, the data storage device comprising a reserve set of memory blocks and a first set of memory blocks at a first capacity level and a first performance level;
    in response to receiving a first selection associated with a first storage mode from a user, allocating the reserve set of memory blocks to provide a second performance level greater than the first performance level, wherein the second performance level comprises at least one of faster write speed and greater endurance in comparison to the first performance level;
    in response to receiving a second selection associated with a second storage mode from the user, allocating the reserve set of memory blocks to provide a second capacity level greater than the first capacity level; and
    in response to receiving a third selection associated with a third storage mode from the user, allocate the reserve set of memory blocks to provide a third performance level and a third capacity to either balance or prioritize performance or capacity based on a ratio indicated by a user using an open sliding scale.

13. The method of claim 12, wherein the reserve set of memory blocks comprises hybrid memory cells configured to operate in either single-level cell (SLC) mode or multi-level cell (MLC) mode.

14. The method of claim 13, wherein:
    allocating the reserve set of memory blocks to provide the second performance level comprises configuring the hybrid memory cells to operate in SLC mode; and
    allocating the reserve set of memory blocks to provide the second capacity level comprises configuring the hybrid memory cells to operate in MLC mode.

15. The method of claim 13, wherein:
    the data storage device further comprises a fingerprint sensor formed on an external surface of an enclosure of the data storage device; and receiving the selection of the first storage mode from the user comprises:
  receiving a first fingerprint on the fingerprint sensor; and
  determining that the first fingerprint is associated with the first storage mode.

16. The method of claim 15, wherein receiving the selection of the second storage mode from the user comprises:
  receiving a second fingerprint on the fingerprint sensor; and
  determining that the second fingerprint is associated with the second storage mode.

17. The method of claim 12, wherein:
  receiving the selection of the first storage mode from the user comprises receiving, on a user interface associated with the data storage device, the selection of the first storage mode; and
  receiving the selection of the second storage mode from the user comprises receiving, on the user interface associated with the data storage device, the selection of the second storage mode.

18. The method of claim 12, further comprising:
  indicating the first storage mode is active by causing one or more light emitting diodes (LEDs) of the data storage device to display a first color; and
  indicating the second storage mode is active by causing the one or more LEDs to display a second color.

19. A data storage device comprising:
  means for storing data comprising:
    a first set of memory blocks at a first capacity level and a first performance level; and
    a reserve set of memory blocks;
  means for receiving a selection of a storage mode of a plurality of storage modes from a user; and
  control circuitry configured to:
    in response to receiving the selection of a first storage mode of the plurality of storage modes, allocate the reserve set of memory blocks to provide a second performance level greater than the first performance level, wherein the second performance level comprises at least one of faster write speed and greater endurance in comparison to the first performance level;
    in response to receiving the selection of a second storage mode of the plurality of storage modes, allocate the reserve set of memory blocks to provide a second capacity level greater than the first capacity level; and
    in response to receiving the selection of a third storage mode of the plurality of storage modes from the user, allocate the reserve set of memory blocks to provide a third performance level and a third capacity to either balance or prioritize performance or capacity based on a ratio indicated by a user using an open sliding scale.

* * * * *